Dec. 15, 1964  H. TIMM  3,161,852
INDICATING DEVICE, ESPECIALLY FOR INDICATING
THE POSITION OF THE LANDING GEAR AND
LANDING GEAR DOOR OF AIRPLANES
Filed June 25, 1962  3 Sheets-Sheet 1

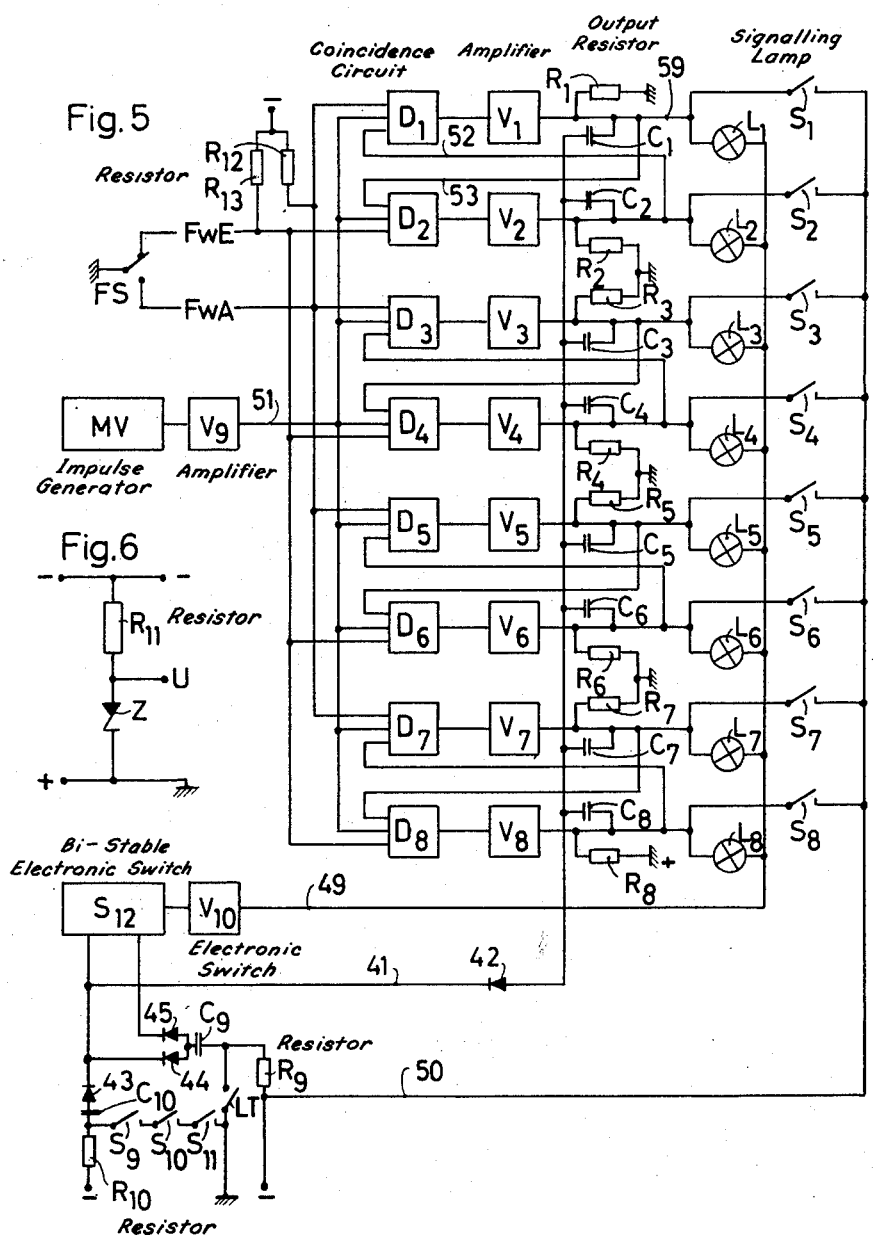

Dec. 15, 1964
H. TIMM
3,161,852
INDICATING DEVICE, ESPECIALLY FOR INDICATING
THE POSITION OF THE LANDING GEAR AND
LANDING GEAR DOOR OF AIRPLANES
Filed June 25, 1962
3 Sheets-Sheet 3
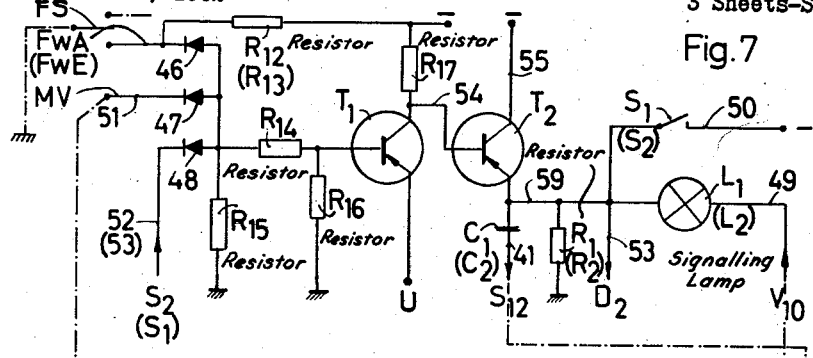
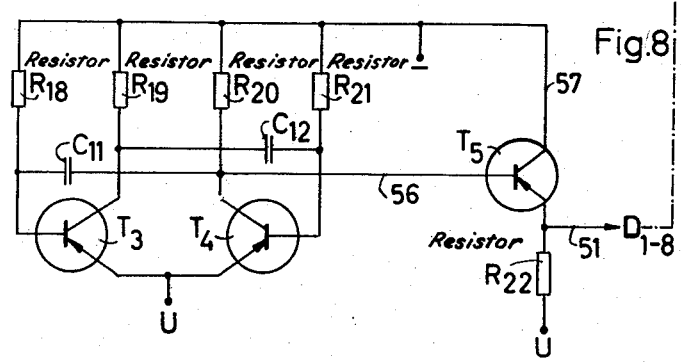
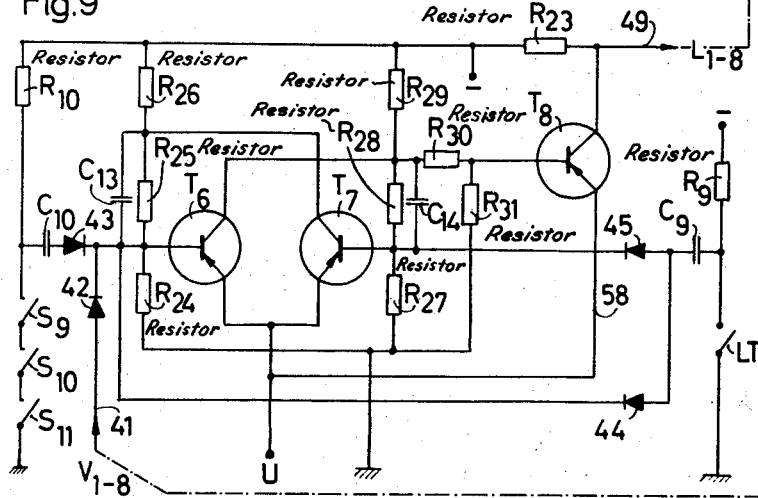

United States Patent Office 3,161,852
Patented Dec. 15, 1964

3,161,852
INDICATING DEVICE, ESPECIALLY FOR INDICATING THE POSITION OF THE LANDING GEAR AND LANDING GEAR DOOR OF AIRPLANES
Heinz Timm, Regensburg, Germany, assignor to Diehl, Nurnberg, Germany
Filed June 25, 1962, Ser. No. 204,835
Claims priority, application Germany, June 27, 1961, D 36,677
8 Claims. (Cl. 340—27)

The present invention relates to an indicating device including electronic means for indicating the position of structural elements movable into an effective and ineffective position, especially for indicating the position of the landing gear and the landing gear doors of airplanes.

For the above-mentioned purpose, it is known to provide two electronic signalling circuits, for each of the structural elements to be checked, and, more specifically, one electronic signalling circuit for the effective position of the respective structural element, and another signalling circuit for the ineffective position of the respective structural element. Each of said signalling circuits comprises a switch and a signalling lamp arranged in series and connected to a source of voltage. When one of said structural elements has reached one of its positions, for instance, its effective position, the circuit associated with said position is closed whereby the respective signalling lamp in said circuit, for instance a green lamp, will light up. The other position, for instance the ineffective position, will have associated therewith a checking circuit with another signalling lamp, for instance, a red lamp. Such an installation does not indicate anything about an intermediate position during the movement of the respective structural element from its effective to its ineffective position, and vice versa, inasmuch as each of said two lamps will light up only when the respective structural element is either in its effective or in its ineffective position, but not when said structural element is in an intermediate position. However, there exists the possibility that a fault prevails in the installation when the signalling lamps do not light up. It is, of course, possible to indicate such intermediate position by a further signalling circuit with a third, for instance yellow, signalling lamp. However, such a third signalling circuit would represent a considerable complication in the installation. Moreover, when the signalling lamp would light up, the pilot could not recognize whether the respective structural element is on its way to the effective or to the ineffective position.

It is, therefore, an object of the present invention to provide an indicating device of the general character set forth above which, even though only two signalling circuits are employed, will considerably improve the installation.

It is another object of this invention to provide an indicating device as set forth in the preceding paragraph, which, in spite of the provision of two signalling circuits only, will indicate an intermediate position.

These and other objects and advantages of the invention will appear more clearly from the following specification in connection with the accompanying drawings, in which:

FIGURE 5 illustrates the total control circuit for the device according to the invention.

FIGURE 6 is a circuit diagram of the voltage divider provided in the device.

FIGURE 7 is a diagram of the signalling lamp and circuit with the associated electronic network.

FIGURE 8 is a diagram of the electronic impulse emitter for producing an alternating voltage.

FIGURE 9 is a diagram of the electronic turn-on and turn-off switch with the connected electronic power switch including the switch means for operating said turn-on and turn-off switch.

According to one feature of the present invention, the condition of the signalling lamp "non-illumination" is eliminated from the signalling, and the intermediate position of the structural elements to be checked between the end positions is indicated by blinking signals.

According to a further feature of the invention, the intermediate position of the structural elements to be checked when moving from the ineffective to the effective position, or vice versa, is indicated by blinking signals of one group of signalling lamps.

According to a further feature of the invention, means are provided by which the signalling lamp field after the structural elements have reached a predetermined end position, may be extinguished while the indication can be extinguished by the pilot only when all signalling circuits have reached the intended end position and have been indicated by a continuous lighting-up of the signalling lamps pertaining thereto.

A further feature of the invention consists in that in cases of danger, for instance when the airplane has started its landing maneuver while the landing gear has not been brought into its effective position, the signalling lamp will automatically light up.

According to a still further feature of the invention, it is intended also with accidental opening of the locking device or when the landing gear door opens accidentally, to indicate this condition by a blinking of the respective signalling lamp.

A further feature of the invention consists in a particularly simple optical indicating means for indicating the end and intermediate position of the structural elements to be checked.

Figure 1:
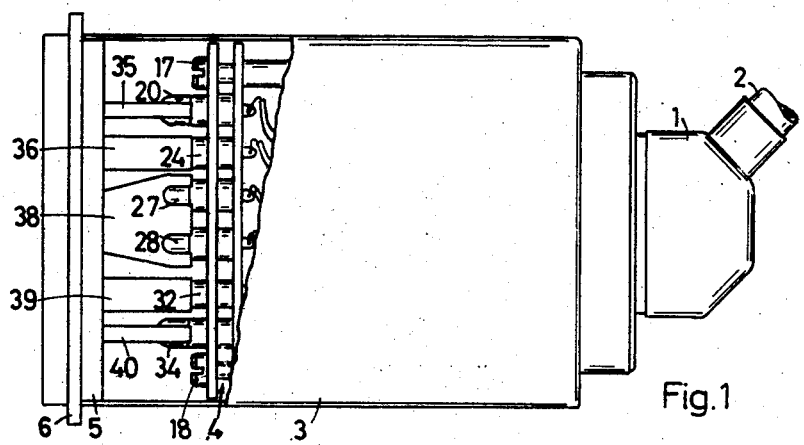
FIGURE 1 is an overall top view of an indicating device according to the invention with the front wall partially removed.
Figure 2:
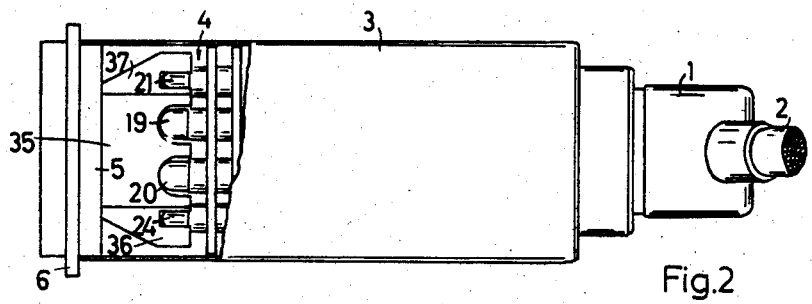
FIGURE 2 is a side view of the indicating device of FIGURE 1, likewise with a part of the front wall removed.

Referring now to the drawing, the indicating device according to FIGS. 1 and 2 is mounted in a housing 3 having its front side provided with a signalling field 7 (FIG. 4) and a plug mounted on the rear end of the device. The rear portion of the housing 3 has arranged therein an electronic impulse emitter, an electronic bistable switch, a voltage distributor, and a number of electric lamp switch amplifiers. These parts may in a manner known per se, be designed in the form of printed circuits. In the front portion of housing 3 there is provided a lamp field 4. Housing 3 is closed at the front by an insert frame 5 which, for instance, is connected to housing 3 by screws. By means of flange 6, the device may be installed from the front as well as from the rear on a dashboard and may be connected thereto. In view of the multiple plug 1 and cable 2, the device may be connected to a current supply and to the adjustable structural elements, especially the landing gear and landing gear doors of an airplane.

Figure 4:
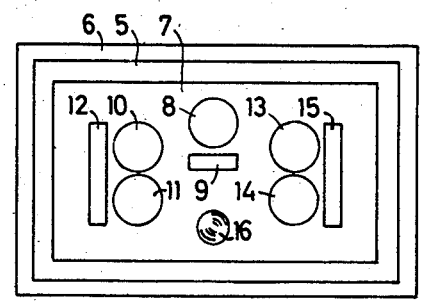
FIGURE 4 is the front view of the device according to the invention with the symbol windows provided on the indicating field.

The insert frame 5, 6 illustrated in FIG. 4 has in its signalling field 7 provided for each structural element to be checked, a window symbolizing the respective structural feature. Thus, for instance, the circular surface 8 in the center of the field may be associated with a nose-wheel, the horizontal rectangle 9 therebelow may be associated with the nose-wheel door, the circular surface 10 at the left-hand upper portion may be associated with the left front landing gear, and the circular surface 11 at the lower left-hand portion may be associated with the left rear landing gear, while the rectangle 12 adjacent the circular surfaces 10, 11 may be associated with the left-hand landing gear door. The circular surface 13 at the right-hand upper portion will then be associated with the right-hand front landing gear, and the circular surface 14 at the right-hand lower portion will be associated with the right-hand rear landing gear, while the vertical rectangle 15 adjacent to and at the right-hand side of said circular surfaces 13, 14 will be associated with the right-hand landing gear door. Thus, each structural element to be checked has associated therewith a window in a position on the signalling field which corresponds to the position on the airplane. Moreover, the device also comprises a cancelling key 16 which protrudes forwardly beyond the signalling field 7.

Figure 3:
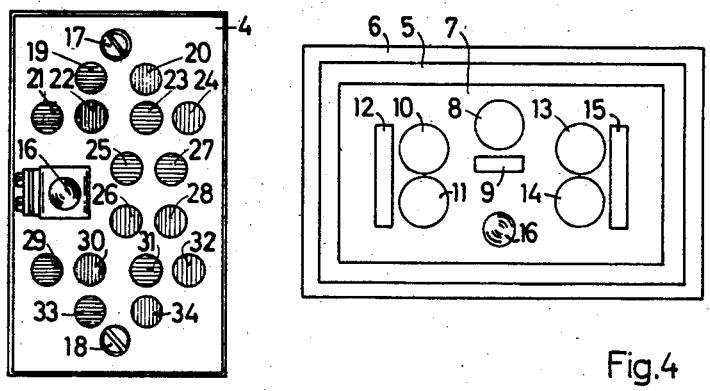
FIGURE 3 is a top view of the signalling lamp field provided with a cancelling key.

FIG. 3 shows a front view of the lamp field 4. This lamp field is connected to the electronic circuit therebehind by means of screws 17, 18. The lamp field 4 comprises a total of sixteen signaling lamps 19 to 34 of which, for instance, the vertically shaded lamp is intended to represent a red lamp, while the horizontally shaded lamp is intended to represent a green lamp. Two signalling lamps each, for instance 19 and 20, have associated therewith a window 12. In order to assure a uniform lighting-up of the respective signalling window 8 to 15 by the green lamp as well as by the red lamp, light guiding means may be provided between the signalling lamps associated with the structural member to be checked and the windows for said signalling lamps, while the signalling lamps 19 to 34 extend in the said light guiding means. In FIGS. 1 and 2, said light guiding means are designated with the reference numerals 35 to 40. The light guiding means may consist, for instance, of a light permeable or slightly milky, cloudy synthetic material which at the outside, is so shaped and mirrored that from each lamp, approximately the same quantity of light is conveyed to the window pertaining thereto and with the window will be uniformly illuminated.

*Circuit Diagram*

The indicating and checking device illustrated in FIGS. 1 to 4 comprises sixteen signalling circuits of which ten circuits are employed for checking the five landing gears, while six circuits are employed for checking the three landing gear doors. Fig. 5 shows only eight of said sixteen signalling circuits. Each two signalling lamps for checking one structural element are arranged below each other, and on the right side thereof there are arranged the switches pertaining thereto. The signalling lamps $L_1$, $L_3$ . . . with uneven sub-indices are intended to represent green signalling lamps 19, 21, etc. illustrated with horizontal shading and serve, for instance, for indicating the effective position of the respective structural element. In an analogous manner, the signalling lamps $L_2$, $L_4$ with even sub-indices correspond to the red signaling lamps 20, 22 of FIG. 3 illustrated by vertical shading. These lamps, when lighting up, indicate the position of the respective structural element.

The signalling lamps $L_1$–$L_8$ have their left pole connected to the voltage source, indicated by a minus sign, for instance, the dashboard network, through the intervention of limit switches $S_1$–$S_8$ through a common conductor 50. One switch pair $S_1$, $S_2$; $S_3$, $S_4$, etc. is located at a suitable position in the airplane with regard to the structural element to be checked, for instance so that only when this structural element has reached its intended position, or is properly locked in said position, will the respective limit switch be closed. The right-hand poles of the signalling lamps $L_1$–$L_8$ lead through a common conductor 49 to an electronic switch $V_{10}$ which is adapted to be switched on and off by a bi-stable electronic switch $S_{12}$. The design of the switch $S_{12}$ and $V_{10}$ is shown in detail in FIG. 9. Arranged in parallel to switches $S_1$–$S_8$ and connected to the left-hand pole of the signalling lamps $L_1$–$L_8$ is the exit of electronic networks which consist primarily of a diode-equipped coincidence circuit $D_1$–$D_8$ and amplifier and reversing circuit means $V_1$–$V_8$ connected thereto. FIG. 7 illustrates the specific design of these networks which, in FIG. 5, are shown as rectangles only.

The exit conductors 59 of these amplifiers $V_1$–$V_8$ leading to the signalling lamps are respectively connected to ground through resistors $R_1$–$R_8$. Furthermore, the said conductors 59 are through coupling condensers $C_1$–$C_8$ respectively connected to a conductor 41 which, through the intervention of a diode 42, leads to the left-hand operating conductor of switch $S_{12}$. The importance of this conductor will be set forth further below.

In FIG. 5 the rectangle with the legend MV represents an impulse generator controlling an amplifier $V_9$. The exit of this amplifier $V_9$ is through a conductor 51 connected to the inlet of all diode networks $D_1$–$D_8$. Impulse generator MV and amplifier $V_9$ are illustrated in detail in FIG. 8. Furthermore, the installation has a reversible switch FS the movable part of which is connected with the operating member for the control of the landing gear. The conductor designated FWA leads to the inlets of the diode networks $D_1$, $D_3$, etc. provided with uneven letters, and the conductor designated FWE leads to the inlets of the diode networks $D_2$, $D_4$, etc., designated with the even letters. Each of these two conductors FWA and FWE is additionally, through restrictors $R_{12}$, $R_{13}$ connected to the source of current to the dashboard network and, during the reversing of the switch FS and the turning on of the respective selected signalling channels is, by means of said switch FS, connected to ground. Furthermore, the diagram in FIG. 5 also comprises coupling conductors 52, 53 which, with the two networks of the signalling circuits pertaining to each other, respectively connect the amplifier exit of one network with the diode inlet of the other network for controlling the same structural elements. The conductors 52 and 53 will, as will be explained further below, control the mutual blocking of the networks associated with the two signalling circuits of a structural element.

The diagram of FIG. 5 also comprises switches $S_9$, $S_{10}$, $S_{11}$ of which, for instance, switch $S_{10}$ is connected with the throttle linkage for the airplane motors and is closed when the engine throttles are moved toward closed position, and switch $S_9$ is connected with the landing gear doors in such a way that the two switches $S_9$ and $S_{10}$ will be closed when the airplane driving motors are throttled and the landing gear doors are opened. Switch $S_{11}$ is furthermore to be connected with the control member for the actuation of the landing gear in such a way that when the control member is shifted for moving the landing gear outwardly, $S_{11}$ will be closed. In FIG. 5 there is also illustrated a switch LT. This switch is intended to be able to turn off the signalling installation after it has properly indicated the nominal position of the structural elements. The operation of switch LT will be discussed in detail in connection with FIG. 9.

For purposes of feeding the control installation, an independent voltage source may be employed. However, it is also possible, to this end, to employ the dashboard network although the latter is subject to relatively high variations in voltage. In order to eliminate these voltage fluctuations at the most important points of the checking device, as far as it is possible, according to FIG. 6, for purposes of feeding the installation, also an intermediate voltage U is employed which, on one hand, through resistor $R_1$ is connected with the dashboard network, and on the other hand, through a Zener diode, is connected to ground. This last-mentioned diode establishes the voltage U even when the dashboard network is fluctuating greatly.

The diode networks, designated in FIG. 5 with the characters $D_1$–$D_8$ consist, as indicated in FIG. 7, primarily of diodes 46, 47, 48, the common exit of which leads to the base of a transistor $T_1$ through a resistor $R_{14}$. The diode 46 is, at its entry side, connected to the control conductor, indicated in FIG. 5 with the reference numeral FWA or FWE. The diode 47 has its entry side connected through conductor 51 with the amplifier $V_9$, and the inlet side of diode 48 is, through conductor 52, 53 connected to the outlet of the second amplifier passage pertaining thereto. As shown in the diagram, the diode exit is through a resistor $R_{15}$ connected with ground, and the base of the transistor $T_1$ is connected with ground through a resistor $R_{16}$. Finally, as mentioned above, the conductors FWA and FWE are, through resistors $R_{12}$ and $R_{13}$ connected to a negative voltage source.

The amplifying reversing switch, indicated in FIG. 1 with the characters $V_1$, $V_2$, etc. consists, as indicated in FIG. 7, of the two p, n, p-transistors $T_1$ and $T_2$. The emitter of the transistor $T_1$ is connected to the abovementioned potential U. The collector of $T_1$ is, through a resistor $R_{17}$ connected to the aforementioned negative voltage source. A conductor 54 leads from the collector of the transistor $T_1$ to the base of the transistor $T_2$ the emitter of which is, as mentioned above, through resistors $R_1$, $R_2$ connected to ground and also is connected to the left pole of the signalling lamp $L_1$, $L_2$. The collector of the transistor $T_2$ is through the conductor 55 connected to a negative voltage source. The diodes 46, 47, 48 illustrated in FIG. 7 are for a positive current leading from the right toward the left, and for a negative current leading from left to right. When a positive voltage prevails at the base with regard to the potential U or to ground, the transistors $T_1$ and $T_2$ block the current passage between emitter and collector and, at a negative voltage at the base with regard to the potential U or to ground, the transistors $T_1$ and $T_2$ act as conductors. The operation of the control circuit illustrated in FIG. 7 is as follows: If the inlet of one or both diodes 46, 48 is connected to the neagtive voltage of the network, the transistor $T_1$ becomes conductive. The line 54 between transistor $T_1$ and the base of $T_2$ will then receive a positive potential so that $T_2$ will be blocked. At the emitter of the transistor $T_2$ and thus at the conductor 59 a positive potential will form through resistor $R_1$. If now, by reversing the landing gear switch FS, the conductor FWA is connected to the mass and if, through the corresponding non-conductive transistor $T_2$ of the channel pertaining thereto also conductor 52 is connected to a positive potential, the alternating impulses coming through conductor 51 and diode 47 from the alternating current source will alternately open and block the transistor $T_1$. As a result thereof, at the emitter of the transistor $T_2$ and thus also at the conductor 59, an alternating current will form, by means of which the signalling lamp $L_1$; $L_2$ will give off a blinking signal only when the signalling switch $S_1$, $S_2$ is opened. The coincidence arrangement illustrated in FIG. 7 in combination with the amplifying and reversing arrangement illustrated by the transistors $T_1$ and $T_2$ thus makes it possible selectively, depending on the position of the landing gear switch FS, to provide one group of the signalling lamps with an alternating current and to turn off the other group, and vice versa.

FIG. 8 illustrates an embodiment for an impulse generator which is intended to produce a frequency of 100 cycles. This impulse generator primarily comprises the two transistors $T_3$ and $T_4$, the emitters of which are connected to a direct current source U and the bases and collectors being connected through resistors $R_{18}$, $R_{19}$, $R_{20}$ and $R_{21}$ to a negative voltage. The condensers $C_{11}$, $C_{12}$ respectively couple the collector of one transistor to the base of the other transistor. The collector of the righthand transistor $T_4$ is furthermore, through a line 56, connected to the base of a power transistor $T_5$ the collector of which is through line 57 connected to the above-mentioned negative voltage, while the emitter thereof through a resistor $R_{22}$ is connected to the direct current source U.

A line 51 connects the emitter of the transistor $T_5$ with one diode 47 each of the network $D_1$–$D_8$. In view of the reactive coupling through the condensers $C_{11}$, $C_{12}$, by appropriately dimensioning the resistors $R_{18}$–$R_{21}$, by means of the circuit, it is possible to obtain a trigger oscillation which, in line 56, will produce an alternating voltage by means of which the output transistor $T_5$ will be made alternately conductive or blocked. Consequently, in line 51 an alternating potential will be produced which oscillates between the direct current potential of the network and the potential U. This alternating current may, as mentioned above, be employed for feeding all of the networks associated with the signalling circuits.

The elements illustrated in FIG. 5 with the reference characters $S_{12}$ and $V_{10}$ are shown in detail in FIG. 9. Switch $V_{10}$ for turning on and off the arrangement, consists primarily of a power transistor the emitter of which is connected through a line 58 to the voltage U while the collector of said power transistor $T_8$ receives a negative voltage through a resistor $R_{23}$. Moreover, the collector of this transistor $T_8$ is connected to a collecting line 49 (FIG. 5). The power transistor $T_8$ is blocked, for instance, when its base has a positive voltage and is conductive when its base has a negative voltage with regard to the emitter. If it is conductive, the line 49 will have about the potential U, and when it is blocked, the line 49 will have the net potential.

For switching on and off the power transistor $T_8$ there is provided a bi-stable switch which consists primarily of the two transistors $T_6$ and $T_7$. The emitters of these transistors are both receiving the voltage U. The collectors and bases of these two transistors receive their voltage through two voltage dividers comprising the resistors $R_{24}$, $R_{25}$ and $R_{26}$ on one hand and $R_{27}$, $R_{28}$ and $R_{29}$ on the other hand, which are connected between ground and net voltage. The collector of transistor 7 is furthermore connected to the base of the transistor $T_6$ through a condenser $C_{13}$, whereas the collector of transistor $T_6$ is connected to the base of the transistor $T_7$ through a condenser $C_{14}$. The collector of the transistor $T_6$ is, through a resistor $R_{30}$ connected to the base of the power transistor $T_3$. The base of the transistor $T_8$ is through a resistor $R_{31}$ connected to ground. The resistors $R_{24}$–$R_{31}$ and the coupling condensers $C_{13}$ and $C_{14}$ are so dimensioned that each time, only one of the two transistors $T_6$ or $T_7$ is conductive and the other one is non-conductive, and when a positive voltage impulse occurs at the bases of the transistors $T_6$ and $T_7$, the switch shifts over from the respective position to the other stable position. If the transistor $T_6$ is blocked, the base of the power transistor $T_8$ will, through resistors $R_{29}$ and $R_{30}$ have a negative potential, which means it becomes conductive. If, however, the transistor $T_6$ is conductive, the base of power transistor $T_8$ will have a positive potential, and therefore, is blocked.

It will, therefore, be evident from FIG. 9 that when a positive impulse hits the base of transistor $T_6$ or when shifting the bi-stable switch so that the base of the transistor $T_6$ becomes positive, the power transistor $T_8$ will be conductive and thus line 49 will feed the signalling circuits. This switching-on of line 49 may be effected in various manners, viz. on one hand by the signalling installation itself and on the other hand by the switches $S_9$–$S_{11}$ arranged in series, and by the manually operable switch LT.

As has already been mentioned, the exits of the amplifiers $V_1$–$V_8$ are connected through condensers $C_1$–$C_8$ and diode 42 with the base of transistor $T_6$. This, however, means that as long as any one of the circuits connected to the alternating current source is not closed, this alternating current source will, through one of the condensers $C_1$–$C_8$ continuously furnish positive switch-on impulses to the base of transistor $T_6$ by means of which impulses line 49 remains electrically connected to the current source U. Only when all switches $S_1$, $S_3$ ... or $S_2$, $S_4$ ... are closed, will line 59 of the signalling lamps pertaining thereto receive a negative net voltage so that the said alternating current impulses will stop. It is only in this condition of the signalling installation that the power transistor $T_8$ will be switched off by the fact that line 49 will likewise obtain the voltage of the dashboard network.

For switching at random switch $V_{10}$ on and off, the pushbutton switch LT is employed, the movable pole of which is connected, for instance, with ground and the fixed pole of which is connected through resistor $R_9$ to the dashboard network and leads to the right-hand side of condenser $C_9$. The left-hand side of condenser $C_9$ is, through a diode 44 connected in a conductive manner with the base of transistor $T_6$ and through a diode 45 to the base of the transistor $T_7$. When closing switch LT, the right-hand side of condenser $C_9$ is connected to ground whereby a positive switch impulse passes through diodes 44 and 45 to the bases of the transistors $T_6$ and $T_7$. If no switch impulses arrive through line 41, the switch LT of power transistors $T_8$ may be switched off and line 49 may, through resistor $R_{23}$ receive the net voltage.

The circuit according to FIG. 9 furthermore comprises a condenser $C_{10}$ whose right-hand side is electrically connected through conduit 43 with the base of transistor $T_6$, while the left-hand side on one hand receives the net voltage through a resistor $R_{10}$ and on the other hand leads to a pole on the series arranged switches $S_9$, $S_{10}$, $S_{11}$.

When closing the three switches $S_9$, $S_{10}$ and $S_{11}$, it is therefore possible by connecting the left-hand side of condenser $C_{10}$ to ground to emit a positive switch impulse to transistor $T_6$ whereby the latter will be blocked and the power transistor $T_8$ will be opened. When the airplane carries out its landing maneuver, the switches $S_9$, $S_{10}$, $S_{11}$ are closed and line 49, therefore, receives the voltage U so that the position of the landing gear will be indicated to the pilot by the red signalling lamps lighting up.

*Summary*

The indicating apparatus according to the present invention thus not only indicates the end position of the elements to be checked, by illumination of the green or red signalling lamps, but also indicates the intermediate position by blinking signals. When the landing gear is moved out, for instance green blinking signals may be given, whereas when moving in, red blinking signal may be given. The signalling indication can be extenguished only when the limit switch of the ordered nominal position of the respective elements is closed and the respective signalling lamps are permanently illuminated. If one of the limit switches does not close, for instance in view of the lock of the structural element being detached, all signalling lamps of the respective end position are automatically switched on again whereby the signalling lamps of the opened limit switch will give off a blinking signal. In cases of danger, for instance when the landing maneuver is initiated, the signalling indication becomes automatically effective. If one of the signalling lamps turns dead, and the switch pertaining to said respective lamp opens, no blinking signal will be sent out but the alternating voltage impulses hitting switch $S_{12}$ bring about that all parallelly arranged signalling lamps will be illuminated and cannot be extinguished, whereby the pilot will be able to ascertain the occurring fault.

In the foregoing specification, it will be understood, particularly upon reference to FIG. 6, that what has been referred to as net voltage or network voltage is the negative side of the line, while the positive side of the line is at ground potential. The voltage U, as will be evident from FIG. 6, is an intermediate voltage between the aforementioned negative voltage and ground potential. The foregoing will serve to indicate the direction of current flow so that the potentials established across the various resistors by means of which the triggering pulses for the transistors are obtained, will be readily comprehended.

It is, of course, to be understood that the present invention is, by no means, limited to the particular construction and arrangement shown in the accompanying drawings but also comprises any modifications within the scope of the appended claims.

What I claim is:

1. An indicating device for movable elements which have two end positions for indicating when the elements occupy their end positions and the direction of movement of the elements when the elements are moving between said end positions, especially elements such as landing gears and landing gear flaps of airplanes, which comprises: first and second signal lamps associated with each movable element and each lamp indicating one of the end positions of the element pertaining thereto, a circuit for each lamp, an end switch in each circuit, each end switch being so arranged that it is closed when the element pertaining thereto occupies its corresponding end position, a further switch for each lamp, each said further switch having a terminal connected to the pertaining lamp, a control circuit connected to the other terminal of each of said further switches, an impulse generator connected to said control circuit to supply pulsating current through said further switches to said lamps, and switch means having a predetermined position for each of the directions of movement of said movable elements, said switch means being operatively connected with said control circuit for selectively blocking the control circuits pertaining to one of said first or second lamps with regard to the voltage produced by said impulse generator and means responsive to closing of all of the end switches pertaining to the lamps which pertain to the unblocked control circuits for interrupting the supply of pulsating current.

2. An indicating device for movable elements which have two end positions for indicating when the elements occupy their end positions and the direction of movement of the elements when the elements are moving between said end positions, especially elements such as landing gears and landing gear flaps of airplanes, which comprises: first and second signal lamps associated with each movable element and each lamp indicating one of the end positions of the element pertaining thereto, a circuit for each lamp, an end switch in each circuit, each end switch being so arranged that it is closed when the element pertaining thereto occupies its corresponding end position and causes steady state illumination of the pertaining lamp, a further switch for each lamp, said further switch having a terminal connected to one terminal of the pertaining lamp, a control circuit connected to the other terminal of each of said further switches, an impulse generator connected to said control circuits to supply pulsating current to said lamps, switch means having a predetermined position for each of the directions of movement of said movable elements, said switch means being operatively connected to said control circuits for selectively blocking the control circuits pertaining to one of said first or second lamps with regard to the voltage produced by said impulse generator, a feed line connected to the poles of said lamps which are not connected to said end switches, a switch member located in said feed line for interrupting the supply of current to said lamps to thereby switch off said limps, and control members operable for controlling said switch member.

3. An indicating device according to claim 2, in which said control members operable for controlling said switch member comprise a first selectively operable switch and second, third, and fourth switches in series, said second switch being operable into closed position by movement of landing gear flaps into approaching position, said third switch being operable into closed position by movement of an engine throttle to closed position, and said fourth switch being operable into closed position by a landing gear in the lifted position thereof while being opened in the lowered position of the landing gear.

4. An indicating device according to claim 2, which includes a common control line connected to the poles of said signal lamps that are connected to said end switches, direct current blocking means between each lamp and said common control line blocking the direct current, a one-directional conductor element having an input terminal connected to said common control line, and the output terminal of said one-directional conductor element being connected to a control terminal of said switch member so that switching impulses are conveyed to said switch member when any one of said end switches is open.

5. An indicating device for movable elements which have two end positions for indicating when the elements occupy their end positions and the direction of movement of the elements when the elements are moving between said end positions, especially elements such as landing gears and landing gear flaps of airplanes, which comprises: first and second signal lamps associated with each movable element and each lamp indicating one of the end positions of the element pertaining thereto, a circuit for each lamp, an end switch in each circuit, each end switch being so arranged that it is closed when the element pertaining thereto occupies its corresponding end position, a power transistor connected in parallel to each end switch, a control transistor for each of said power transistors, a multi-vibrator, one coincidence circuit for each of said control transistors, the output terminal of said multivibrator being connected to an input terminal of each of said coincidence circuits, a reversing switch having fixed contacts connected to another input terminal of said coincidence circuits, said reversing switch being operable into a different one of two positions thereof for each direction of movement of said movable elements, said coincidence circuits being operatively connected to said reversing switch so that when the reversing switch is in position, said first signal lamps flash in conformity with the frequence produced by said multi-vibrator, and when said reversing switch is in the other position said second signal lamps flash in conformity with the frequence produced by the said multi-vibrator.

6. An indicating device for movable elements which have two end positions for indicating when the elements occupy their end positions and the direction of movement of the elements when the elements are moving between said end positions, especially elements such as landing gears and landing gear flaps of airplanes, which comprises: first and second signal lamps associated with each movable element and each lamp indicating one of the end positions of the element pertaining thereto, a circuit for each lamp, an end switch in each circuit, each end switch being so arranged that it is closed when the element pertaining thereto occupies its corresponding end position, a power transistor connected in parallel to each end switch, a control transistor for each of said power transistors, a multi-vibrator, one coincidence circuit for each of said control transistors, the output terminal of said multi-vibrator being connected to an input terminal of each of said coincidence circuits, a reversing switch having a pair of fixed contacts one of which is connected to an input terminal of the said coincidence circuits pertaining to said first lamps, while the other said contact is connected to an input terminal of the said coincidence circuits pertaining to said second lamps, said reversing switch having a blade operable into engagement with one or the other of said contacts in accordance with the direction of movement of said movable elements, each said coincidence circuit becoming effective for passing current from said multi-vibrator to said lamps upon the pertaining one of said blade closing on the contact pertaining to the said coincidence circuit, a feed line connected to the side of each lamp which is not connected to an end switch, a switch transistor located in said feed line for interrupting the lamp current, a bi-stable electronic switch connected in controlling relation to said switch transistor, and control members connected in controlling relation to said bi-stable electronic switch for controlling the latter.

7. An indicating device according to claim 6, in which said control members comprises a first selectively operable switch, and other serially connected switches including; a second switch adapted for closing when landing gear flaps are in approaching position, a third switch adapted for closing in conformity with the throttling of fuel, and a fourth switch adapted for being closed in the lifted position of the landing gear and opened in the lowered position thereof.

8. An indicating device according to claim 6, which includes a common control line, a condenser connected on the one hand to each of said signal lamps on the side thereof connected to the pertaining end switch and on the other hand to said common control line, and a diode connecting said control line to the control entrance of said bi-stable electronic switch so that while one of said end switches is open impulses are conveyed to said bi-stable electronic switch.

References Cited in the file of this patent
UNITED STATES PATENTS

| | | |
|---|---|---|
| 1,940,836 | Ayer | Dec. 26, 1933 |
| 2,116,960 | Brown et al. | May 10, 1938 |
| 2,738,491 | Mihalakis | Mar. 13, 1956 |
| 2,917,731 | Rogers | Dec. 15, 1959 |
| 3,017,609 | Ritchie | Jan. 16, 1962 |